(12) United States Patent
Scholl et al.

(10) Patent No.: US 6,697,690 B2
(45) Date of Patent: Feb. 24, 2004

(54) CUSTOMIZING PROCESS FLOWS (75) Inventors: Juergen Scholl, Bretten (DE); Dirk Rohdemann, Muehlhausen (DE); Thomas Vomhof, Wiesloch (DE)

(73) Assignee: Sap Aktiengesellschaft (DE)

( * ) Notice: Subject to any disclaimer, the term of this patent is extended or adjusted under 35 U.S.C. 154(b) by 0 days.

(21) Appl. No.: 10/210,198

(22) Filed: Jul. 31, 2002

(65) Prior Publication Data

US 2003/0195647 A1 Oct. 16, 2003

Related U.S. Application Data (60) Provisional application No. 60/372,896, filed on Apr. 15, 2002.

(51) Int. Cl.$^7$ .............................................. G06F 19/00
(52) U.S. Cl. ........................... 700/100; 700/99; 700/101
(58) Field of Search ............................ 700/100, 97, 99, 700/101, 19; 705/8

(56) References Cited

U.S. PATENT DOCUMENTS

| | | | | |
|---|---|---|---|---|
| 5,291,394 A | * | 3/1994 | Chapman ..................... | 700/100 |
| 5,748,478 A | * | 5/1998 | Pan et al. ..................... | 700/99 |
| 6,115,646 A | * | 9/2000 | Fiszman et al. ............ | 700/104 |
| 6,522,934 B1 | * | 2/2003 | Irwin et al. .................... | 700/19 |

OTHER PUBLICATIONS

American National Standard document ANSI/ISA–S88.01–1995 entitled "Batch Control Part 1: Models and Terminology," Approved Oct. 23, 1995.
Instrument Society of America document ISA–dS88.02–1999, Draft 14 entitled "Batch Control Part 2: Data Structures and Guidelines for Languages," Draft 14, May, 1999.

* cited by examiner

Primary Examiner—Albert W. Paladini
(74) Attorney, Agent, or Firm—Fish & Richardson P.C.

(57) ABSTRACT

Method and apparatus, including computer program product for customizing a process flow. The product includes instructions to cause a processor to receive a process flow description, receive a first resource description from a first remote system, customize the process flow description to the first resource description, receive a second resource description from a second remote system, and customize the process flow description to the second resource description. The process flow description describes a process flow. The first resource description describes resources deployable by the first remote system and the second resource description describes resources deployable by the second remote system. The product is tangibly stored on machine readable media.

23 Claims, 9 Drawing Sheets

CUSTOMIZING PROCESS FLOWS

This application claims the priority of U.S. Provisional Application Ser. No. 60/372,896, filed Apr. 15, 2002, the contents of which are incorporated herein by reference.

BACKGROUND

This invention relates to process flows.

A process flow is a sequence of chemical, physical, or biological activities for the conversion, transport, or storage of material or energy. For example, process flows are used for the production of specialty chemical products, pharmaceutical products, fuels, cosmetics, and foodstuffs. Recipes include information related to the process flow for the production of a product. Recipes can also include definitions of resources such as equipment that is deployed to perform the process flow, as well as materials input to perform the process flow and output materials resulting from performance of the process flow.

There are different classes of recipes. General recipes ("GR") include information related to the process flow independent of specific production resources. General recipes identify raw materials, relative quantities, and required processing, but lack specific information regarding a particular site or the resources available at that site. Site recipes ("SR") include site-specific information related to the local constraints, such as language and available raw materials at a particular production locale. Master recipes ("MR") include resource capabilities such as equipment deployable to perform a process flow, and describe activities for a specific production on a specific line. Master recipes can also include information that is specific to a process cell.

One use of process flows and recipes is in the manufacture and the production of products. In this case, a process flow typically represents some manufacturing or production operation. The information included in the process flow describes, e.g., the manufacturing or production process, raw materials, and available equipment.

SUMMARY

The present invention provides methods and apparatus, including computer program products, for customizing process flows.

In general, in one aspect, a method for customizing a process flow includes receiving a recipe hierarchy describing the process flow. The hierarchy includes a higher level having a higher level element and a lower level having a lower level element. The process flow can be customized by receiving resource information describing resources deployable to perform the process flow, allocating a resource described by the resource information to the higher level element based on a criterion for performing a higher level activity in the process flow described by the higher level element, and determining operating instructions for the resource based on a lower level activity in the process flow described by the lower level element.

Implementations of this or any other aspect can include one or more of the following features. The received hierarchical recipe structure can be a general recipe describing the process flow. The process flow information can be customized to the resource information by creating a customized recipe hierarchy that includes the allocated resources and the determined operating instructions. The customized recipe hierarchy can be created by creating a master recipe.

The higher level of the recipe hierarchy can include two higher level elements The process flow information can be customized to the resource information by transferring the two higher level elements to the customized recipe hierarchy and defining a relationship between the two higher level elements in the customized recipe hierarchy. The relationship can be a time sequence of the elements.

The operating instructions can be determined by accessing a mapping rule describing deployment of the resource and determining operating instructions for the resource based on the accessed mapping rule.

The process flow information can be customized to the resource information by receiving a selection identifying a portion of the recipe hierarchy including the higher level element and the lower level element but excluding an undesired element. The undesired element can be excluded from resource allocation and operating instruction determination.

The process flow information can be customized to the resource information by identifying an input stream to the portion of the recipe hierarchy and adding a material in the input stream to a bill of materials for the customized recipe hierarchy.

In general, in another aspect, a computer program product for customizing a process flow includes instructions to cause a processor to receive a process flow description, receive a first resource description from a first remote system, customize the process flow description to the first resource description, receive a second resource description from a second remote system, and customize the process flow description to the second resource description. The process flow description describes a process flow. The first resource description describes resources deployable by the first remote system and the second resource description describes resources deployable by the second remote system. The product is tangibly stored on machine readable media.

Implementations of this or any other aspect can include one or more of the following features. The instructions cause the processor to receive a collection of destinations for the process flow description that has been customized to the first resource description. The instructions cause the processor to add an inspection characteristic to the process flow description that has been customized to the first resource description.

The instructions cause the processor to allocate a resource described in the first resource description to an activity described in the process flow description based upon a stringency of a resource criteria for the activity. The instructions cause the processor to create a bill of materials that includes information relating to materials used in the process flow.

The instructions cause the processor to access a first mapping rule describing deployment of a first resource described by the first resource description and access a second mapping rule describing deployment of a second resource described by the second resource description.

The instructions cause the processor to form a customized hierarchy to customize the process flow description to the second resource description. The instructions cause the processor to describe a material flow between elements in the customized hierarchy. The instructions cause the processor to receive changes to the process flow description while customizing to the first resource description.

The invention can be implemented to realize one or any combination of the following advantages. A system in accordance with the invention can quickly customize a process flow description to the particular resources that are deployable by multiple remote systems. When the process flow is used in manufacturing and production operations, the system enables a user to quickly and efficiently configure and adapt such manufacturing and production. (A user can include a person, a computer-program product, a computer system, or any combination thereof.) Moreover, the system can maintain control of the process flow description and change the process flow description during customization. Resources can be allocated to the process flow according to the needs of the activities in the process flow, and relationships between the activities in the process flow can be determined during customization. The customized process flow can be transmitted to one or more other systems. The other systems can be remote from each other and linked as part of a network. Inspection characteristics that describe desired traits of the process flow or materials in the process flow can be determined for each set of deployable resources. By storing information about manufacturing and production activities in coherent and adaptive structures, the system can quickly adapt the activities to create new product versions, store historical records of activities, and manufacture products under different conditions.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
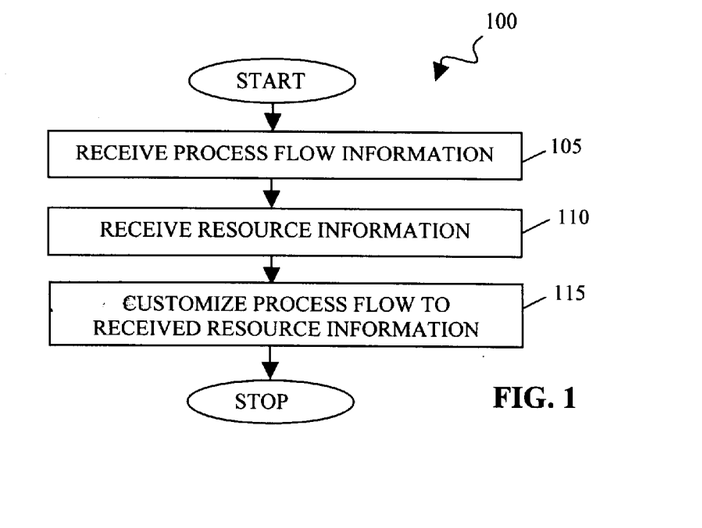
FIG. 1 shows a method for customizing a process flow.

FIG. 1 shows a method 100 for customizing a process flow. A system performing the method 100 receives process flow information describing a process flow (step 105). A process flow is a sequence of chemical, physical, or biological activities for the conversion, transport, or storage of material or energy. The process flow information can describe the process flow in the absence of information about the resources used to perform the process flow. For example, the process flow information can describe that a mixture with a certain viscosity is to be mixed at a certain rate and temperature without identifying a particular mixing vessel.

The system receives resource information describing the resources that are deployable for performing the process flow described in the process flow information (step 110). The resource information can include, e.g., information about available equipment and materials that a performance site can draw upon to perform the process flow. For example, the resource information can specify a mixing vessel that is available at a performance site. The resource information can include information such as vessel volume, and throughput, shear rate during stirring, and heating or cooling capabilities. The resource information can be received, e.g., directly from a user, from a resource information database or other library, or from the resources themselves.

The system customizes the process flow to relevant portions of the received resource information (step 115). For example, the system can map the mixing process to the mixing vessel by determining a batch size based on the volume of the mixing vessel and then include the batch size in the process flow. The batch size can be included in the process flow by, e.g., propagating the batch size throughout the process flow to determine, e.g., required material and equipment resources.

By customizing the process flow, the system maps the process flow to the deployable resources. Although it may not be possible to directly use the customized process flow for production, the resource information decreases the additional effort needed to prepare the process flow for production.

Figure 2:
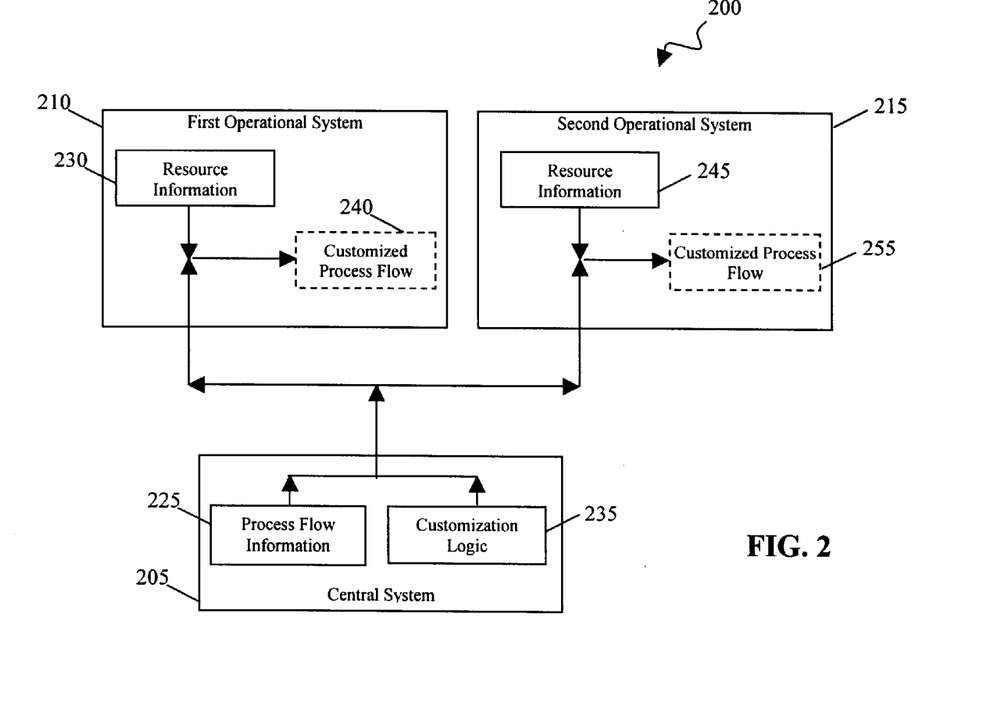
FIG. 2 shows a system customizing a process flow.

As shown in FIG. 2, a system 200 for customizing a process flow in accordance with the invention includes a central system 205, a first operational system 210, and a second operational system 215. Central system 205 can be a central database that is managed by, e.g., the owner of a branded product, while operational systems 210, 215 can belong to e.g., a site or a company that executes process flows. Central system 205 can communicate with operational systems 210, 215 over a data transmission network such as, e.g., the Internet.

Central system 205 includes process flow information 225 that describes a process flow. Central system 205 also includes customization logic 235. Customization logic 235 includes data and rules for customizing process flow information. The data can specify, for example, the resources of first operational system 210 that are available to perform the process described by process flow information 255. The rules can specify, for example, which of the resources of first operational system 210 can be used to perform the process described by process flow information 255. Customization logic 235 can optionally include instructions that cause a processor to customize process flow information 225 to resource information that describes the resources that are deployable by an operational system for performing the process flow.

First operational system 210 includes resource information 230. Resource information 230 describes the resources that are deployable by first operational system 210. First operational system 210 also includes a data storage device for storing a customized process flow 240.

Second operational system 215 includes resource information 245. Resource information 245 describes the resources that are deployable by second operational system 215. Second operational system 215 also includes a data storage device for storing a customized process flow 255.

In operation, central system 205 receives and maintains process flow information 225 and customization logic 235 until central system 205 receives a request to customize a process flow to the equipment deployable by first operational system 210. In response to the request, central system 205 transmits process flow information 225 and customization logic 235 to first operational system 210. First operational system 210 receives process flow information 225 and customization logic 235, accesses resource information 230, and executes customization logic 235 to customize process flow information 225 to resource information 230. First operational system 210 thus creates customized process flow 240.

A user may also wish to customize process flow information 225 to the equipment deployable by second operational system 215. When central system 205 receives a second request specifying that customization to the equipment deployable by second operational system 215 is desired, central system 205 transmits process flow information 225 and customization logic 235 to second operational system 215. Second operational system 215 receives process flow information 225 and customization logic 235, accesses resource information 245, and executes customization logic 235 to customize process flow information 225 to resource information 245. Second operational system 210 thus creates customized process flow 255.

Two or more distinct customized process flows 240, 255 can thus be created for two or more distinct sets of deployable resources from a single process flow. Moreover, customized process flows 240, 255 can be created in a distributed system landscape where operational systems 210, 215 are remote from central system 205. This allows, e.g., the owner of a branded product who manages central system 205 to provide customized process flows to a remote site or a different company.

Figure 3:
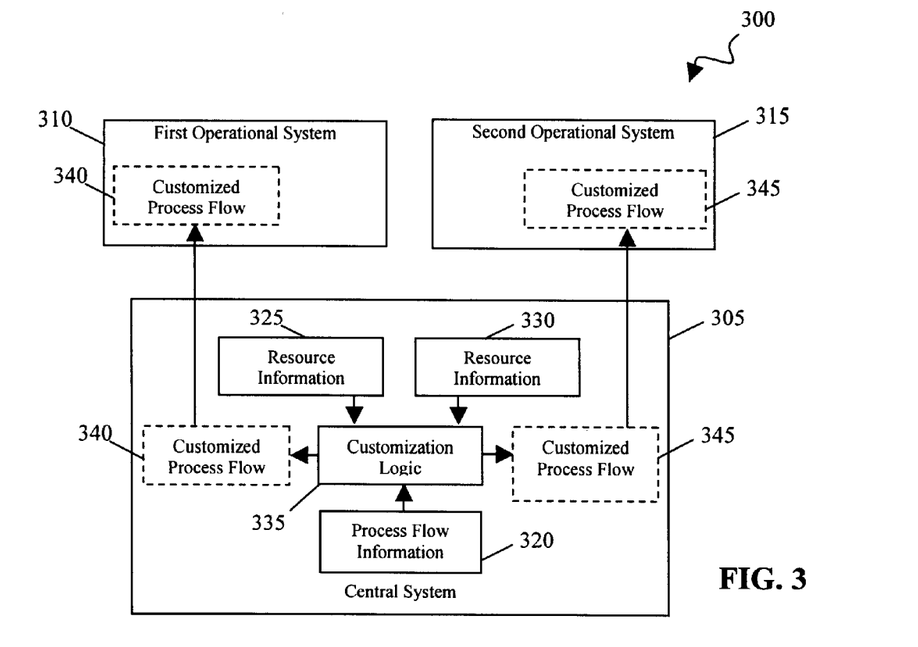
FIG. 3 shows another system customizing a process flow.

As shown in FIG. 3, another system 300 for customizing a process flow includes a central system 305, a first operational system 310, and a second operational system 315. Central system 305 can be managed by, e.g., the owner of a branded product, while operational systems 310, 315 can belong to a site or a company that executes process flows. Central system 305 can communicate with operational systems 310, 315 over a data transmission network.

Central system 305 includes process flow information 320, resource information 325, resource information 330, and customization logic 335. Process flow information 320 describes a process flow. Resource information 325 describes the resources that are deployable by first operational system 310 for performing the process flow. Resource information 330 describes the resources that are deployable by second operational system 315 for performing the process flow. Customization logic 335 includes instructions that cause a processor to customize process flow information 320 to resource information. Central system 305 also includes one or more data storage devices for storing customized process flows 340, 345.

First operational system 310 includes a data storage device for storing a customized process flow 340, and second operational system 315 includes a data storage device for storing a customized process flow 345.

In operation, central system 305 receives and maintains process flow information 320, customization logic 335, resource information 325, and resource information 330. Central system 205 can also receive and maintain additional resource information for other operational systems. Over time, central system 305 can also receive updates to the resource information.

When a user wishes to customize process flow information 320 to the equipment deployable by first operational system 310, central system 305 receives a request to customize process flow information 320 to the equipment deployable by first operational system 310. In response to the request, central system 305 accesses process flow information 320 and resource information 325, and executes customization logic 335 to customize process flow information 320 to resource information 325. Central system 305 thus creates customized process flow 340. Central system 305 then transmits customized process flow 340 to first operational system 310.

The user may also wish to customize process flow information 320 to the equipment deployable by second operational system 315. When central system 305 receives a second request identifying that customization of process flow information 320 to equipment deployable by second operational system 315 is desired, central system 305 accesses process flow information 320 and resource information 330 and executes customization logic 335 to customize process flow information 320 to resource information 330. Central system 305 thus creates customized process flow 345. Central system 305 then transmits customized process flow 345 to second operational system 315.

Two or more distinct customized process flows 340, 345 can be created for two or more distinct sets of deployable resources from a single process flow. Moreover, customized process flows 340, 345 can be created in a distributed system landscape where operational systems 310, 315 are remote from central system 305. This allows, e.g., the owner of a branded product who manages central system 305 to provide customized process flows to a remote site or a different company.

Compared to system 200 shown in FIG. 2, system 300 transmits smaller amounts of data to the operational systems. In particular, system 300 transmits customized process flows 340, 345 to the operational systems, whereas system 200 transmits both process flow information 225 and customization logic 235 to the operational systems. Since process flow information 320 and customization logic 335 do not leave central system 305, a user of central system 305 maintains control over process flow information 320 and customization logic 335. This can be important if, e.g., process flow information 320 and customization logic 325 include proprietary information.

Figure 4:
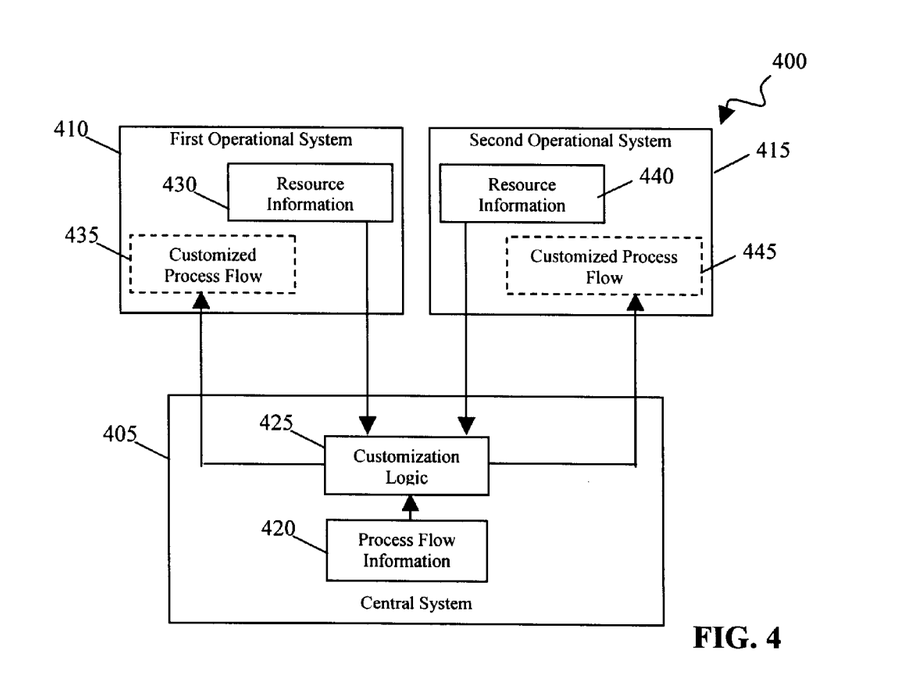
FIG. 4 shows another system customizing a process flow.

As shown in FIG. 4, another system 400 for customizing a process flow in accordance with the invention includes a central system 405, a first operational system 410, and a second operational system 415. Central system 405 can be managed by, e.g., the owner of a branded product, while operational systems 410, 415 can belong to a site or a company that executes process flows. Central system 405 can communicate with operational systems 410, 415 over a data transmission network.

Central system 405 includes process flow information 420 and customization logic 425. Process flow information 420 describes a process flow. Customization logic 425 includes instructions that cause a processor to customize process flow information 420 to resource information.

First operational system 410 includes resource information 430 that describes the resources that are deployable by first operational system 410 for performing the process flow. First operational system 410 also includes a data storage device for storing a customized process flow 435.

Second operational system 415 includes resource information 440 that describes the resources that are deployable by second operational system 415 for performing the process flow. Second operational system 415 also includes a data storage device for storing a customized process flow 445.

In operation, central system 405 receives and maintains process flow information 420 and customization logic 425. If a user wishes to customize process flow information 420 to the equipment deployable by first operational system 410, central system 405 receives a request to customize process flow information 420 to the equipment deployable by first operational system 410. In response to the request, central system 405 contacts first operational system 410 to remotely access resource information 430. First operational system 410 can transmit resource information 430 to central system 405 over a data transmission network. Central system 405 also accesses process flow information 420, and executes customization logic 425 to customize process flow information 420 to resource information 430. Central system 405 thus creates customized process flow 435 and then transmits customized process flow 435 to first operational system 410 over the data transmission network. Alternatively, first operational system 410 may generate the request for customization of process flow information 420 and include resource information 430 in the request.

The user may also wish to customize process flow information 420 to the equipment deployable by second operational system 415. When central system 405 receives a second request identifying that customization of process flow information 420 to the equipment deployable by second operational system 415 is desired, central system 405 contacts second operational system 415 to remotely access resource information 440. Second operational system 415 can transmit resource information 440 to central system 405 over a data transmission network. Central system 405 also accesses process flow information 420 and executes customization logic 425 to customize process flow information 420 to resource information 440. Central system 405 thus creates customized process flow 445 and then transmits customized process flow 445 to second operational system 415 over the data transmission network.

Two or more distinct customized process flows 435, 445 can be created for two or more distinct sets of deployable resources from a single process flow. Moreover, customized process flows 435, 445 can be created in a distributed system landscape where operational systems 410, 415 are remote from central system 405. This allows, e.g., the owner of a branded product who manages central system 405 to provide customized process flows to a remote site or a different company.

Compared to system 200 shown in FIG. 2, system 400 transmits smaller amounts of data to the operational systems. In particular, system 400 transmits customized process flows 435, 445 to the operational systems, whereas system 200 transmits both process flow information 225 and customization logic 235 to the operational systems. Since process flow information 420 and customization logic 425 do not leave central system 405, a user of central system 405 maintains control over process flow information 420 and customization logic 425. This can be important if, e.g., process flow information 420 and customization logic 425 include proprietary information.

Furthermore, since central system 405 remotely accesses process information 430, 440, central system 405 need not maintain and update a resource information database that includes resource information for systems 410, 415. Also, a user of an operational system need not transmit resource information updates to one or more central systems. Rather, an operational system can store an updated version of the resource information and provide the updated resource information to one or more central systems upon request.

Figure 5:
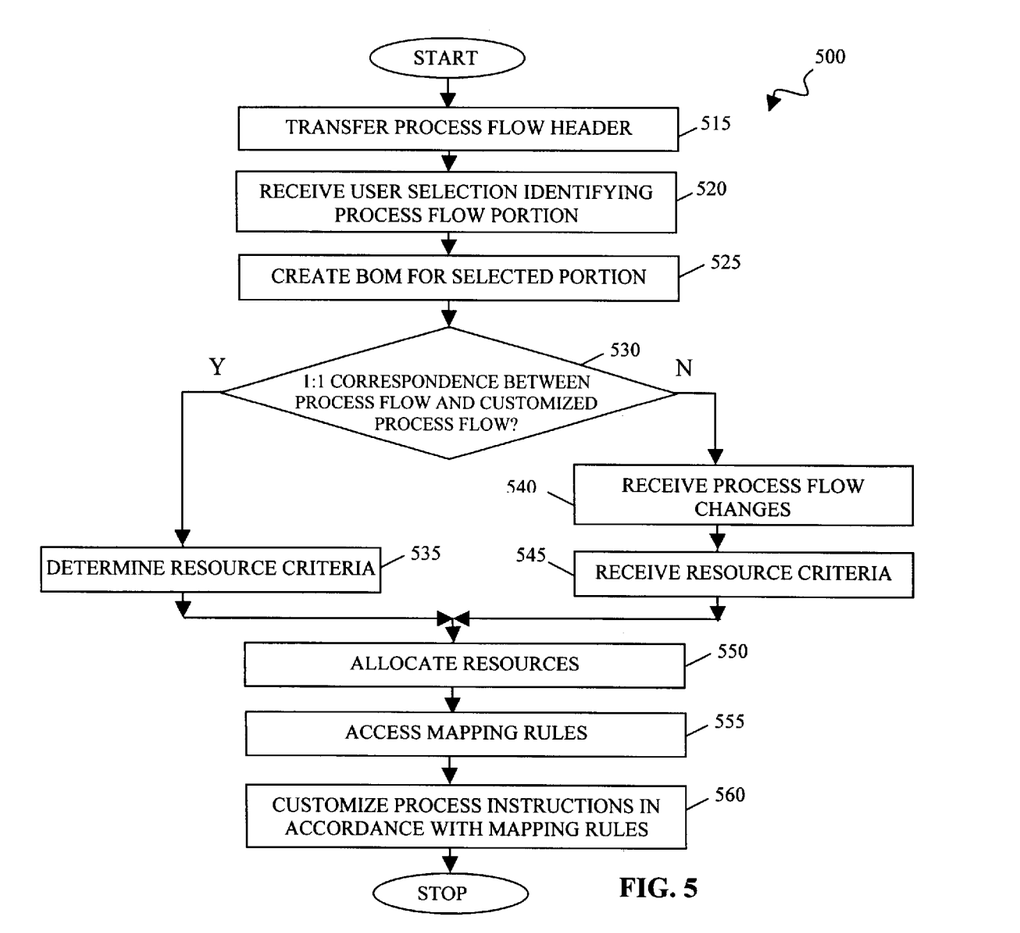
FIG. 5 shows method for customizing a process flow to a particular set of resources.

FIG. 5 shows a method 500 for customizing a process flow to resource information in accordance with the invention. Method 500 can be, e.g., an implementation of step 115 of FIG. 1 and can be performed, e.g., by an operational system or a central system, as discussed above in regard to FIGS. 2–4.

A system performing method 500 transfers a process flow header to the customized process flow (step 515). The header information can include generic, resource-independent information that is applicable to both the process flow and the customized process flow such as, e.g., a name of the process flow, a version identifier, validity dates, ASCII text, and remarks related to the process flow. The header information can also include a range of batch sizes for which the process flow is valid. This transfer results in the creation of a header for the customized process flow.

The system receives a user selection that identifies a portion of the process flow that is to be customized (step 520). The user can be an individual user or a computer program. The user selection can identify the entirety of the process flow or a particular fraction of the process flow. By allowing the user to select a portion of the process flow for customization, it is possible to customize a first portion of the process flow for performance at a first operational system and to customize a second portion of the process flow for performance at a second operational system. It is also possible to customize portions of the process flow immediately before they are about to be performed, so that the customized process flow can include current process flow and resource information.

In some implementations, the system can create a bill of materials (BOM) for the selected portion (step 525) and allocate the BOM to the customized process flow. A BOM includes information relating to the materials used in the process flow. A BOM can include, e.g., names, descriptions, quantities, tolerances, documentation, supplier information, and pricing information for the materials. The system can create the BOM, e.g., by forming a unified list of the materials used in the selected portion of the process flow. The quantity information in the BOM can be normalized to the batch size range found in the header (or to a particular batch size within the batch size range). For example, if the header identifies that the batch size is to be 1000 liters, then the quantities of the materials identified in the BOM can be scaled in accordance with the 1000 liter batch size.

Whether or not a BOM is created, the system then receives a user decision as to whether there is to be a one-to-one correspondence between the selected portion of the process flow and the customized process flow (decision 530). In other words, the system receives a user decision that identifies whether the selected portion of the process flow is to be imported without changes into the customized process flow. If there is to be a one-to-one correspondence, then the system determines resource criteria based on the content of the process flow (step 535). Resource criteria are standards for the resources that are to be deployed to perform the process flow. For example, a resource criteria for an oven can be the maximum temperature attainable by the oven, while a resource criteria for a filter can be the pore size range of the filter. Resource criteria can be included in the description of the process flow or determined from the description of the process flow.

If a one-to-one correspondence is not desired, then the system receives a description of the changes to the process flow (step 540) and a description of the resource criteria for the changes (step 545) from the user. Changes to the process flow can include, e.g., the addition of new activities, the deletion of existing activities, and amendments to the activities forming the process flow. Since the system is able to receive changes to the process flow while customizing the process flow, a user is able to flexibly adapt the customized process flow to temporary or local conditions.

The system then allocates deployable resources in accordance with the received or determined resource criteria (step 550). The allocation can include identifying and selecting resources that meet the resource criteria, and ensuring that the selected resources are deployable to perform the process flow. Resources can be sequentially allocated to different activities within the process flow. The sequence can be determined according to the stringency of the resource criteria. For example, the system can initially allocate resources to an activity with more stringent resource criteria, and later allocate resources to an activity with more lenient resource criteria.

Once resources have been allocated to the activities in the process flow, the system accesses mapping rules that relate to process execution using the allocated resources (step 555). Mapping rules are generic instructions that relate to the deployment of a particular resource. For example, mapping rules can include instructions for operating equipment such as the operational settings and parameters necessary to perform a desired activity. Mapping rules can be included in the resource information.

The system then customizes process instructions for the customized process flow in accordance with mapping rules (step 560). In particular, the system maps the activities in the process flow to the resources that have been allocated using the mapping rules. This customizes process instructions for deploying the allocated resources to perform the process activities.

The generated process instructions need not be sufficient to immediately perform the process flow. For example, the system can poll the user for additional instructions for deploying resources or to resolve conflicts that arise during instruction generation.

Figure 6:
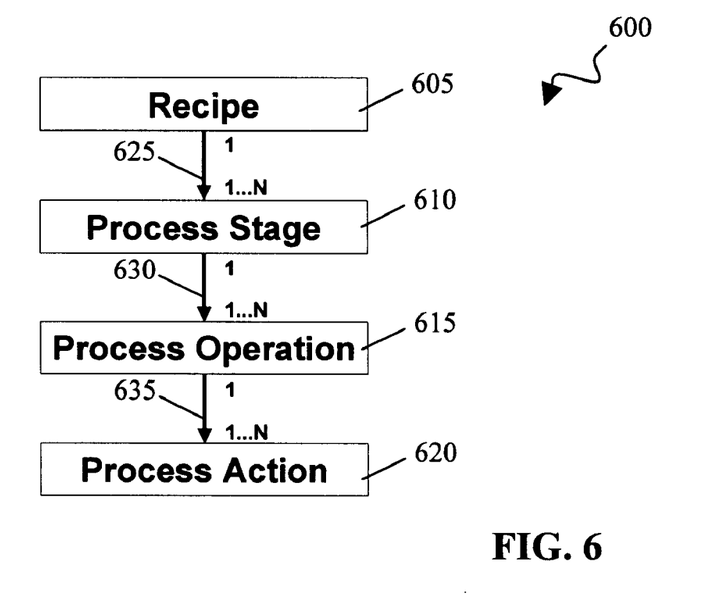
FIG. 6 shows one description of a process flow, namely a process flow hierarchy in a general recipe.

As shown in FIG. 6, one particular description of a process flow is a general recipe 600. General recipe 600 organizes the process flow in a hierarchy and includes several different classes of process elements. In particular, general recipe 600 includes a root recipe element 605, one or more process stage elements 610, one or more process operation elements 615, and one or more process action elements 620. Process elements 605, 610, 615, and 620 are independent of the resources deployed to perform the process flow described by general recipe 600. Process elements 610, 615, and 620 depend from root recipe element 605. These elements are further described below.

Recipe 600 also includes links 625, 630, and 635 that interdependently link process elements 605, 610, 615, and 620 in the hierarchy with a cardinality from 1 to 1 . . . N. In particular, one or more links 625 form a parent-child relationship between parent recipe element 605 and process stage elements 610, one or more links 630 form a parent-child relationship between process stage elements 610 and process operation elements 615, and one or more links 630 form a parent-child relationship between process operation elements 615 and process action elements 620.

Elements 605, 610, 615, and 620 describe portions of the process flow in increasingly greater detail. Fewer or more levels can be included in the hierarchy of recipe 600 to describe the process flow, and the detail described at each level can be changed. However, in one embodiment, elements 605, 610, 615, and 620 describe the process flow as follows.

Recipe element 605 is the root element of recipe 600 and describes the process flow in general terms. Usually, all the activities necessary for the process flow depend from recipe element 605, and a recipe 600 need not possess more than one recipe element 605.

Recipe element 605 includes a serial or parallel sequence of process stages 610. Each process stage 610 can describe a portion of recipe element 605 that operates independently from other process stages 610. Each process stage 610 usually results in a planned sequence of chemical or physical changes in the material being processed. Examples process stages include activities like "drying" and "polymerization."

Each process stage 610 can be subdivided into a set of process operations 615. Each process operation 615 can be a processing activity that results in a physical, chemical, or biological change of a material or substance. Process operations 615 can be defined independently of the target equipment configuration. Examples process operations 615 include "degas solution to remove oxygen," "bias electrode," and "mix."

The difference between a process stage 610 and a process operation 615 can vary. In one embodiment of a recipe element 605, process operations 615 are independent of one another, whereas process stages 610 are dependent on other process stages 610. The example process stages 610 described above may not be independent of one other. For example, biasing an oxygen-sensitive material (which is one process stage) requires that the solution be previously degassed (which is another process stage).

Each process operation 615 can be subdivided into a set of process actions 620. Process actions 620 are the lowest level of processing within each recipe element 605. Each process action 620 can describe a relatively minor processing act in relatively great detail. Example process actions 620 include "heat to 100° C.," "connect the positive lead to the electrode," or "lower the electrode into solution." Each process action 620 thus provides relatively detailed descriptions of the physical acts that are to be performed.

Figure 7:
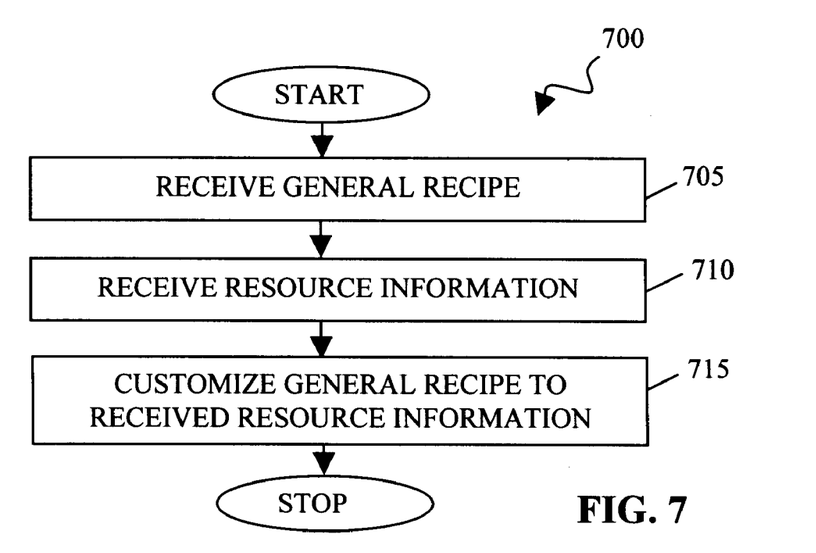
FIG. 7 shows an implementation of the method of FIG. 1 for customizing a general recipe.

FIG. 7 shows an implementation of the method of FIG. 1 for customizing a general recipe 600. A system performing the method 700 receives general recipe 600 (step 705) from, e.g., a user or another system. The system also receives resource information describing the resources that are deployable for performing the process flow described in the general recipe (step 710).

The system then customizes general recipe 600 to relevant portions of the received resource information (step 715). General recipe 600 can be customized to generate, e.g., a master recipe or a site recipe. By customizing the general recipe, the process flow is mapped to the resources available for production of a product.

Figure 8:
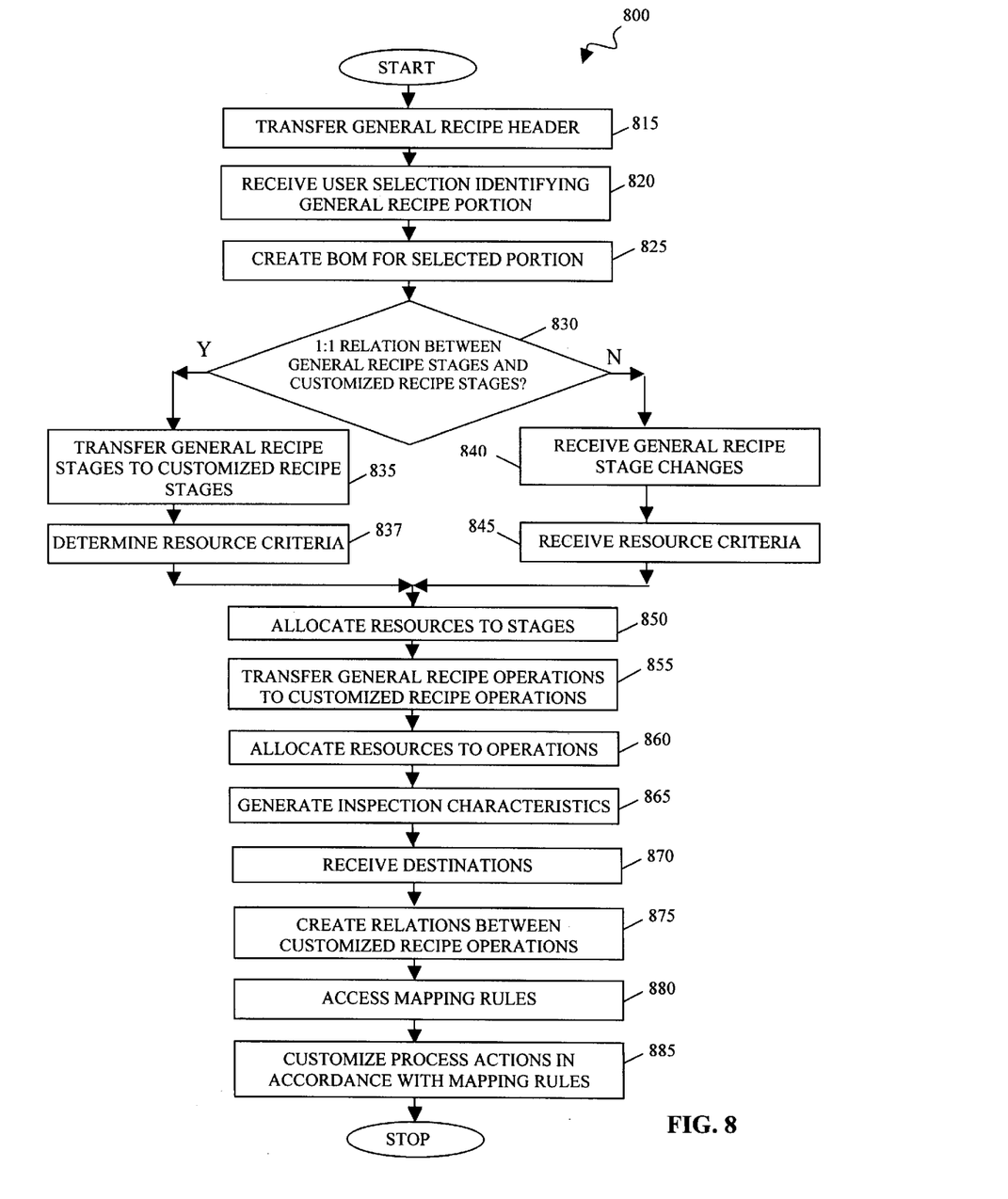
FIG. 8 shows another method for customizing a general recipe to a particular set of resources.

FIG. 8 shows a method 800 for customizing a general recipe to resource information in accordance with the invention. Method 800 can be, e.g., an implementation of step 715 of FIG. 7 and can be performed, e.g., by an operational system or a central system, as discussed above in regard to FIGS. 2–4.

A system performing method 800 transfers a general recipe header to a header for the customized recipe (step 815). Referring to Table 1, data from various fields in the general

TABLE 1

| General Recipe Header Source Field | Customized Recipe Header Destination Field |
|---|---|
| alid From/To | alid From/To |
| ot-Sizes & Units | ot-Sizes & Units |
|  | atch Size Ranges & Units |
| ext | ext |
| atch Size | atch Size | recipe header can be transferred field by field to a header for the customized recipe. For example, a field in the general recipe header that describes the time period when the general recipe is valid can be transferred to a corresponding field in the customized recipe header that describes the time period when the customized recipe is valid. Likewise, a field in the general recipe header that describes the sizes and units of lots of materials used during the performance of the process flow described by the general recipe can be transferred to a corresponding field in the customized recipe header that describes either the sizes and units of lots of materials or the ranges and units of batch sizes.

The system can also insert information that identifies the source general recipe into the header for the customized recipe.

The system also receives a user selection that identifies a portion of the general recipe that is to be customized (step 820). In response to receipt of the selection, the system creates a BOM for the selected portion of the general recipe (step 825) and allocates the BOM to the customized recipe. If the selected portion of the general recipe includes an input stream that originates from a portion of the general recipe that has not been selected, the system can create a new description of the intermediate materials in the input stream and add the new description to the BOM.

The system then receives an input, e.g., a user decision, as to whether there is to be a one-to-one correspondence between the selected portion of the general recipe and the customized recipe (decision 830). If there is to be a one-to-one correspondence, then the system transfers process stages 610 of general recipe 600 to create corresponding process stage elements in the customized recipe (step 837). The system also determines resource criteria based on the content of the process stages 610 (step 840).

If a one-to-one correspondence is not desired, then the system receives a description of the changes to the process stages 610 (step 840) and a description of the resource criteria for the changes (step 845) from the user. Changes can include, e.g., the addition of new process stages 610, the deletion of existing process stages 610, and amendments to the existing process stages 610. Since the system is able to receive changes to the process stages 610 while customizing the general recipe, a user is able to flexibly adapt the customized recipe to temporary or local conditions.

The system then allocates deployable resources in accordance with the received or determined resource criteria (step 850). By allocating resource criteria at the relatively high hierarchical level of process stages 610, the system is able to determine if appropriate equipment is deployable relatively early in the customization process. Once resources have been allocated to the process stages in the customized recipe, the system transfers process operations 610 to create corresponding process operation elements in the customized recipe (step 855). If additional resources are necessary to customize process operation elements 610, then the system can allocate the additional resources to customize the process operation elements 610 (step 860). The allocation can be based on a determination made by the system using resource criteria or the system can request and receive additional user input describing the allocation of the additional resources, as appropriate.

The system can also generate inspection characteristics using the general recipe and resource information (step 865). Inspection characteristics are traits of a process or the streams in a process during execution. A system that is performing the process can monitor the inspection characteristics to ensure that the quality of the execution meets expectations. The generated inspection characteristics can be added to the customized recipe at, e.g., relevant process elements.

The system can also receive one or more destinations for the customized recipe (step 870). A destination is the location of one or more systems that are responsible for performing the customized recipe operations. Since the operation of an individual piece of processing equipment is often controlled by an individual system, even a single customized recipe can be sent to several different destinations. For example, each customized recipe operation can include a destination describing a location of the system responsible for performing the operation.

The destinations for the customized recipe can be determined by the system based on the resource information or the destinations can be received from a user. The user can, e.g., maintain and update the destinations as the locations of deployable resources change.

The system can also create relationships between customized recipe process elements (step 875). The created relationships can include, e.g., links that describe the organization of process elements by material flow or time sequence. The system can create the relationships based on corresponding relationships between process elements in the general recipe. The system can also receive user input that specifies the relationships between customized process elements. The created relationships can be added to the customized recipe, e.g., at the process operation level.

The system also accesses mapping rules that relate to process execution using the allocated resources (step 880), and then customizes process actions for the customized process operations in accordance with mapping rules (step 885). In this way, the customized process actions can describe even relatively minor processing acts in relatively great detail. The customized process actions can also include a description of the processing acts needed to measure the generated inspection characteristics.

Figure 9:
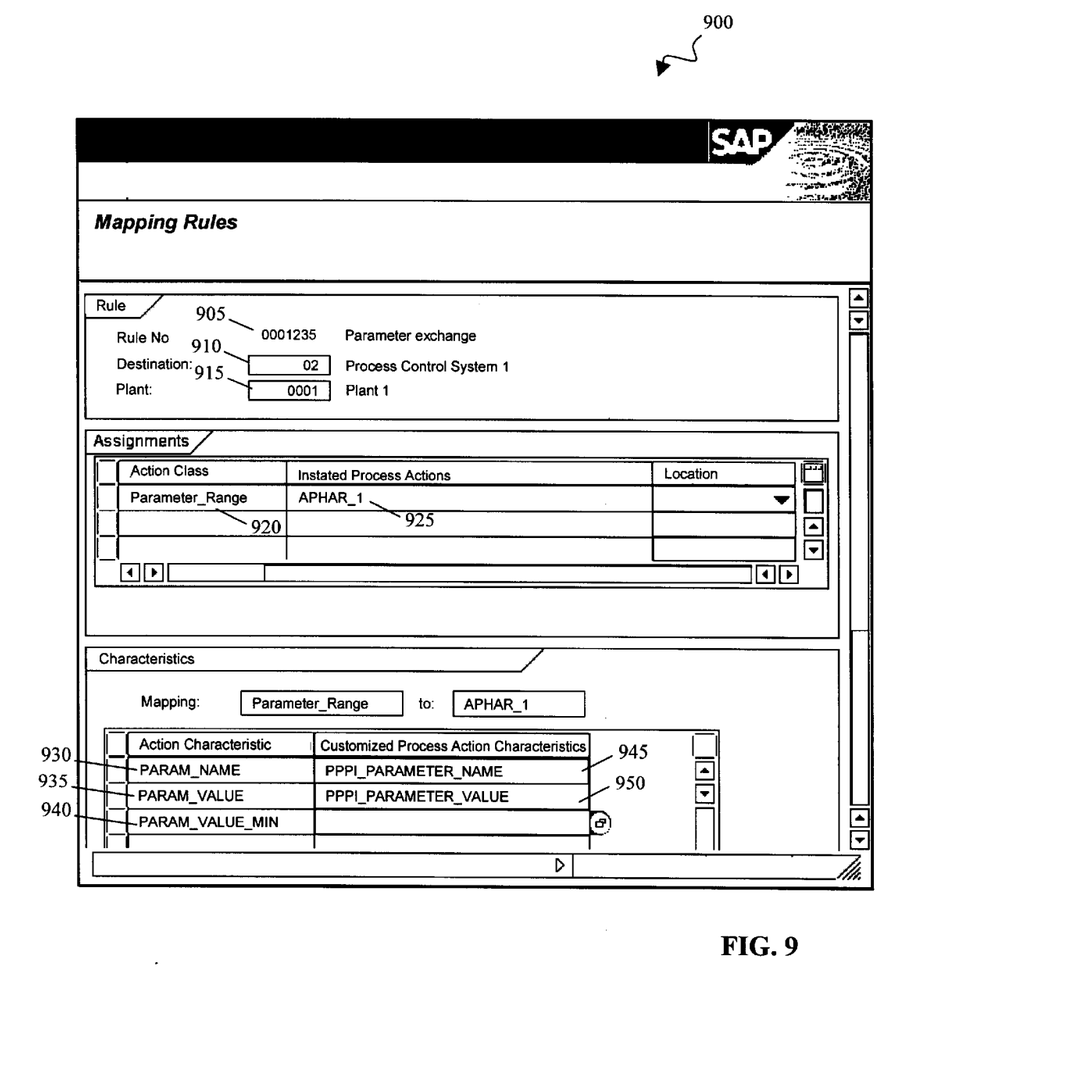
FIG. 9 shows an example screen shot during the generation of a customized process action using a mapping rule.

FIG. 9 shows an example screen shot 900 during the generation of a customized process action using a mapping rule. Screen shot 900 identifies the rule using an alphanumeric identifier 905, as well as the destination system 910 and physical plant 915 for which the rule is relevant.

Screen shot 900 also identifies one or more action classes 920 and one or more customized process actions 925. Action classes 920 include the parameters that can be customized using the mapping rule. For example, action class 920 includes the action characteristics 930, 935, 940. Action classes can also include, e.g., inspection characteristics. Customized process actions 925 include the customized process action characteristics for each action class 920 that have been generated using the rule. For example, customized process action 925 includes process action characteristics 945, 950.

An illustrative example of the customization of a general recipe in accordance with method 800 is now provided in FIGS. 10–15. In particular, a general recipe 1000 for making scrambled eggs is customized.

Figure 10:
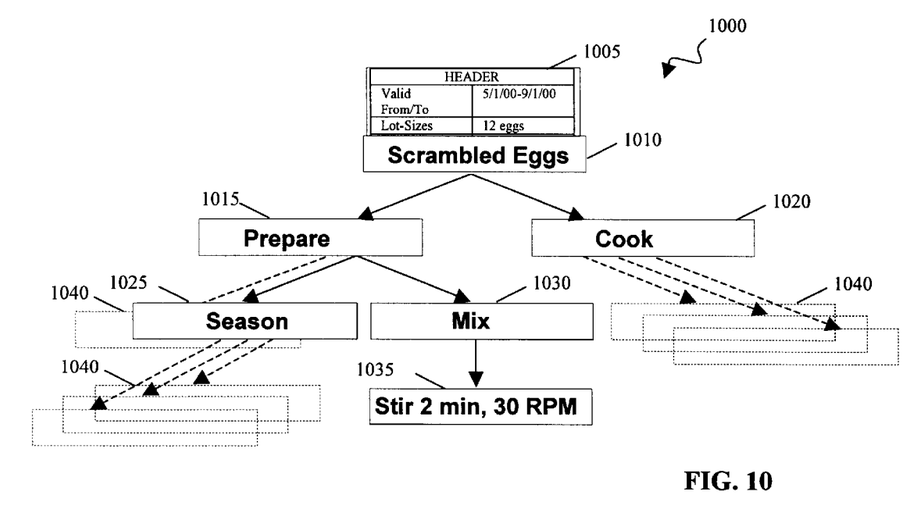
FIGS. 10–15 illustrate an example of customizing a general recipe.

As shown in FIG. 10, general recipe 1000 includes a header 1005, a root recipe element 1010, a preparation stage element 1015, a cook stage element 1020, a season operation element 1025, a mixing operation element 1030, and an action element 1035. Elements 1010, 1015, 1020, 1025, 1030, and 1035 describe activities for making scrambled eggs. General recipe 1000 can also include additional elements 1040 that describe additional activities for making eggs, but that are omitted from FIG. 10 the sake of brevity.

Figure 11:
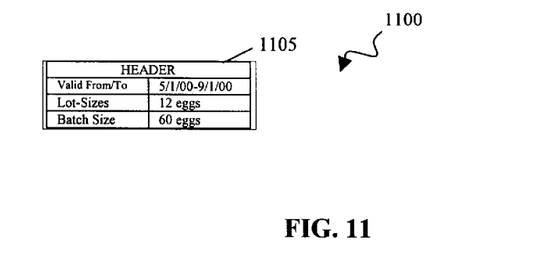
Figure 12:
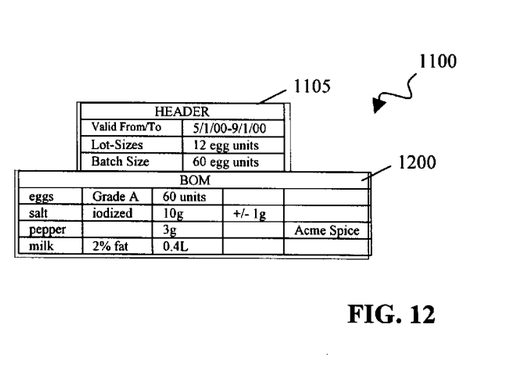

As shown in FIG. 11, when a user indicates that customization of general recipe 1000 is desired, the system performing method 800 transfers a general recipe header 1005 to create a header 1105 for the customized recipe 1100. The system also receives a user selection that identifies that the portions of general recipe 1000 that are shown in solid lines (FIG. 10) are to be customized. As shown in FIG. 12, the system creates a BOM 1200 for the selected portions of general recipe. BOM 1200 can be included in the structure of customized recipe 1100, as shown.

Figure 13:
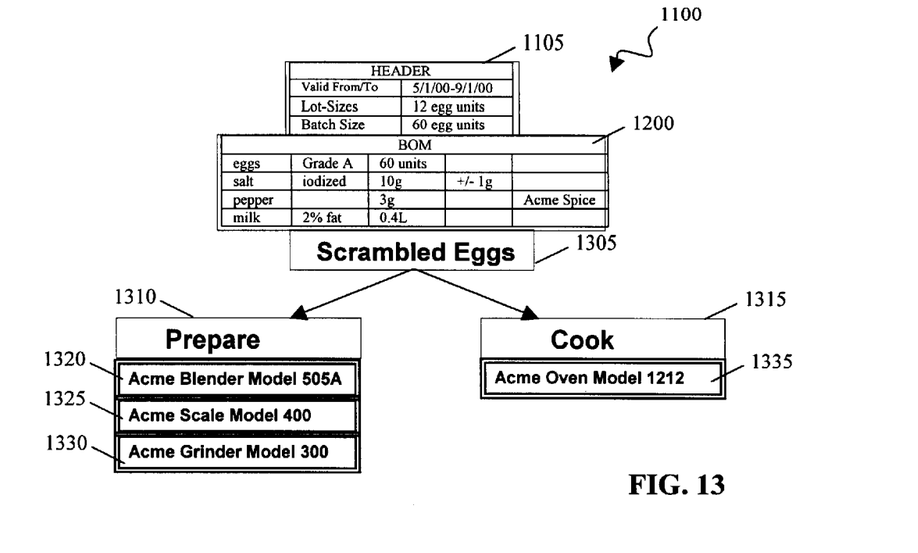

The system also receives a user selection identifying that there is to be a one-to-one correspondence between the stages of the customized recipe and the stages of the general recipe. In response, as shown in FIG. 13, the system transfers preparation stage element 1015 and cook stage element 1020, along with root recipe element 1010, to customized recipe 1100 to create corresponding elements 1305, 1310, and 1315 in customized recipe 1100. In accordance with the resource criteria for the transferred elements, the system allocates a blender resource 1320, a scale resource 1325, and a grinder resource 1330 to preparation stage element 1310 and an oven resource 1335 to cook stage element 1315.

Figure 14:
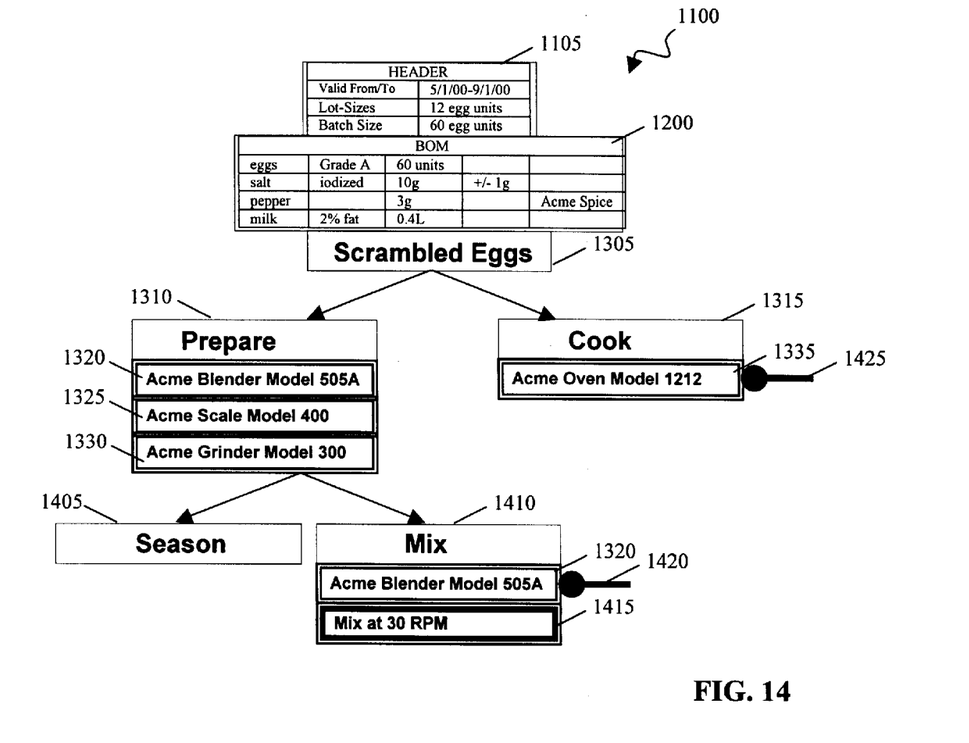

As shown in FIG. 14, after resource allocation to stage elements 1310 and 1315, the system transfers season operation element 1025 and mix operation element 1030 to create corresponding operation elements 1405, 1410 in customized recipe 1100. The system then allocates the resources allocated to preparation stage element 1310 to dependent operation elements 1405, 1410. In particular, the system allocates blender resource 1320 to mixing operation element 1410.

The system also creates inspection characteristic 1415 to describe the desired mixing speed for mix operation element 1030. The system also determines destinations 1420, 1425 for the instructions needed to perform the activities in customized recipe 1100. In particular, the system determines that the instructions for performing the activities described by mix operation element 1410 are to be sent to blender resource 1320 while the instructions for performing the activities described by cook stage element 1315 are to be sent to oven resource 1335.

Figure 15:
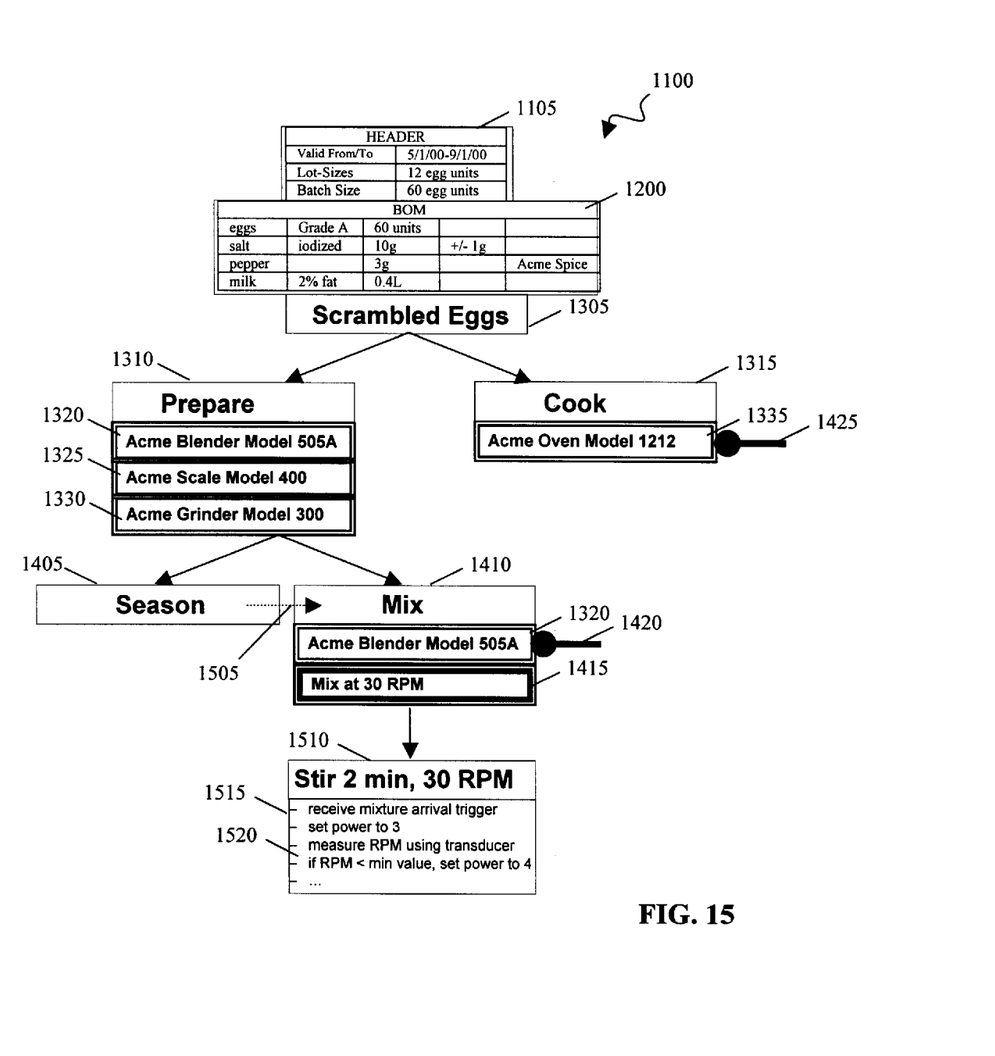

As shown in FIG. 15, the system also creates a relation 1505 between season operation 1405 and mix operation 1410. Relation 1505 indicates the flow of seasoned material from season operation 1405 to mix operation 1410. The system accesses mapping rules and customizes a process action 1510 to the blender resource 1320 and inspection characteristic 1415. In particular, the system creates specific operating instructions 1515 for operating blender resource 1320. Operating instructions 1515 can include instructions 1520 for using inspection characteristic 1415 to ensure quality.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, or embodied in a propagated signal, or embodied in any combination of the machine-readable storage device and the propagated signal. Method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs ("application-specific integrated circuits").

To provide for interaction with a user, the invention can be implemented on a computer system having a display device such as a monitor or LCD screen for displaying information to the user and a keyboard and a pointing device such as a mouse or a trackball by which the user can provide input to the computer system. The system can be programmed to provide a graphical user interface through which computer programs interact with users.

The system can include a back-end component, such as a data server. The system can also include a middleware component, such as an application server or an Internet server. The system can also include a front-end component, such as a client computer having a graphical user interface or an Internet browser. The components of the system can be connected by links, networks, or any combination of both.

A number of implementations of the invention have been described. Nevertheless, it will be understood that various modifications may be made. For example, operational systems can be remote from one another, and from the central system. The systems can communicate using any of a number of different communication devices over any of a number of different communication lines, including a wireless networks, LANs, WANs, cable networks, telephone networks, and computer busses. Accordingly, other implementations are within the scope of the following claims.

What is claimed is:

1. A method for customizing a process flow comprising:
   receiving a recipe hierarchy describing the process flow, the hierarchy including a higher level having a higher level element and a lower level having a lower level element, the lower level element depending from the higher level element;

receiving machine-readable resource information describing resources deployable to perform the process flow;

allocating a resource described by the resource information to the higher level element based on a criterion for performing a higher level activity in the process flow described by the higher level element and the received resource information; and generating operating instructions for the resource based on a lower level activity in the process flow described by the lower level element.

2. The method of claim 1, wherein receiving the hierarchical recipe structure comprises:

receiving a general recipe describing the process flow.

3. The method of claim 1, further comprising:

creating a customized recipe hierarchy that includes the allocated resources and the determined operating instructions.

4. The method of claim 3, wherein creating the customized recipe hierarchy comprises:

creating a master recipe.

5. The method of claim 3, wherein:

the higher level comprises two higher level elements; and the method further comprises:

transferring the two higher level elements to the customized recipe hierarchy; and defining a relationship between the two higher level elements in the customized recipe hierarchy.

6. The method of claim 5, wherein defining the relationship comprises:

defining a time sequence of the elements.

7. The method of claim 1, wherein determining operating instructions comprises:

accessing a mapping rule describing a deployment of the resource; and determining operating instructions for the resource based on the accessed mapping rule.

8. The method of claim 1, wherein customizing the process flow information to the resource information comprises:

receiving a selection identifying a portion of the recipe hierarchy including the higher level element and the lower level element but excluding an undesired element; and excluding the undesired element from resource allocation and operating instruction determination.

9. The method of claim 8, further comprising:

identifying an input stream to the portion of the recipe hierarchy; and adding a material in the input stream to a bill of materials for the customized recipe hierarchy.

10. The method of claim 1, wherein receiving the recipe hierarchy describing the process flow comprises:

receiving the recipe hierarchy describing a sequence of activities for the conversion of material.

11. A computer program product, tangibly stored on machine readable media, for customizing a process flow, the product comprising instructions operable to cause a processor to:

receive a process flow description, the process flow description describing the process flow;

receive a first resource description from a first remote system, the first resource description describing resources deployable by the first remote system;

customize the process flow description to the first resource description to yield a first customized process flow description;

receive a second resource description from a second remote system, the second resource description describing resources deployable by the second remote system; and customize the process flow description to the second resource description to yield a second customized process flow description.

12. The product of claim 11, wherein the product includes instructions to cause the processor to:

receive a collection of destinations for the process flow description that has been customized to the first resource description.

13. The product of claim 11, wherein the product includes instructions to cause the processor to:

add an inspection characteristic to the process flow description that has been customized to the first resource description.

14. The product of claim 11, wherein the product includes instructions to cause the processor to:

allocate a resource described in the first resource description to an activity described in the process flow description based upon a stringency of a resource criteria for the activity.

15. The product of claim 11, wherein the product includes instructions to cause the processor to:

create a bill of materials that includes information relating to materials used in the process flow.

16. The product of claim 11, wherein the product includes instructions to cause the processor to:

access a first mapping rule describing deployment of a first resource described by the first resource description; and access a second mapping rule describing deployment of a second resource described by the second resource description.

17. The product of claim 11, wherein the product includes instructions to cause the processor to:

form a customized hierarchy to customize the process flow description to the second resource description.

18. The product of claim 17, wherein the product includes instructions to cause the processor to:

describe a material flow between elements in the customized hierarchy.

19. The product of claim 11, wherein the product includes instructions to cause the processor to:

receive changes to the process flow description while customizing to the first resource description.

20. The product of claim 11, wherein the product includes instructions to cause the processor to:

receive the process flow description describing a sequence of activities for the conversion of material.

21. A computer program product, tangibly stored on machine readable media, for customizing a process flow, the product comprising instructions operable to cause a processor to:

receive a recipe hierarchy describing the process flow, the hierarchy including a higher level having a higher level element and a lower level having a lower level element, the lower level element depending from the higher level element;

receive machine-readable resource information describing resources deployable to perform the process flow;

allocate a resource described by the resource information to the higher level element based on a criterion for performing a higher level activity in the process flow described by the higher level element and the received resource information; and determine operating instructions for the resource based on a lower level activity in the process flow described by the lower level element.

22. The product of claim 21, wherein the product includes instructions to cause the processor to:

access a mapping rule describing a deployment of the resource; and determine operating instructions for the resource based on the accessed mapping rule.

23. The product of claim 21, wherein the product includes instructions to cause the processor to:

receive a selection identifying a portion of the recipe hierarchy including the higher level element and the lower level element but excluding an undesired element; and exclude the undesired element from resource allocation and operating instruction determination.

* * * * *